June 2, 1936. W. F. MacGREGOR 2,042,612
BALING PRESS
Filed Feb. 8, 1935

INVENTOR.
WALLACE F. MacGREGOR
BY James A. Walsh,
ATTORNEY

Patented June 2, 1936

2,042,612

UNITED STATES PATENT OFFICE 2,042,612

BALING PRESS

Wallace F. MacGregor, Racine, Wis., assignor to J. I. Case Company, Racine, Wis., a corporation Application February 8, 1935, Serial No. 5,531

9 Claims. (Cl. 100—25)

In the operation of baling presses of the type employed for baling hay and other material, which include rapidly actuating mechanisms, a considerable amount of material after having been conveyed into the baling chamber is withdrawn by the reciprocating feeder-head usually employed, and, being of a fluffy character, such material is carried from the feed hopper in the direction of the gearing or other power system commonly provided for actuating the plunger and feeding mechanisms and becomes lodged between rotating elements and strewn about the press, thus interfering with the baling operations and wasting material. It is my object, therefore, to overcome such condition by providing means for baffling and returning such loose material into the feed hopper to compose part of the bales being formed, as will hereinafter further appear.

Figure 1:
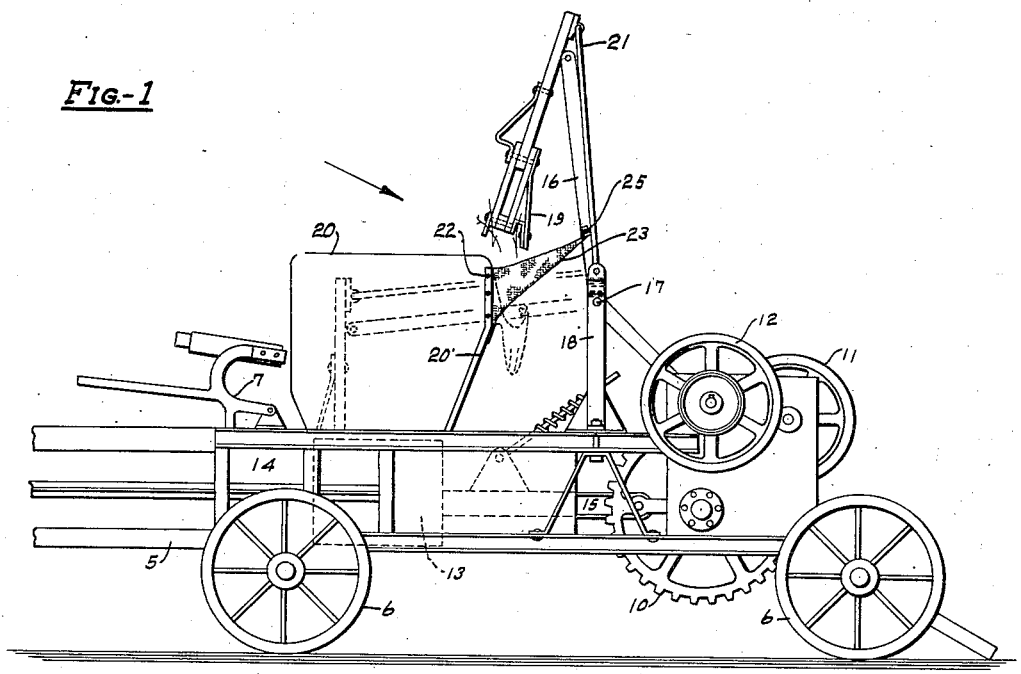
Figure 2:
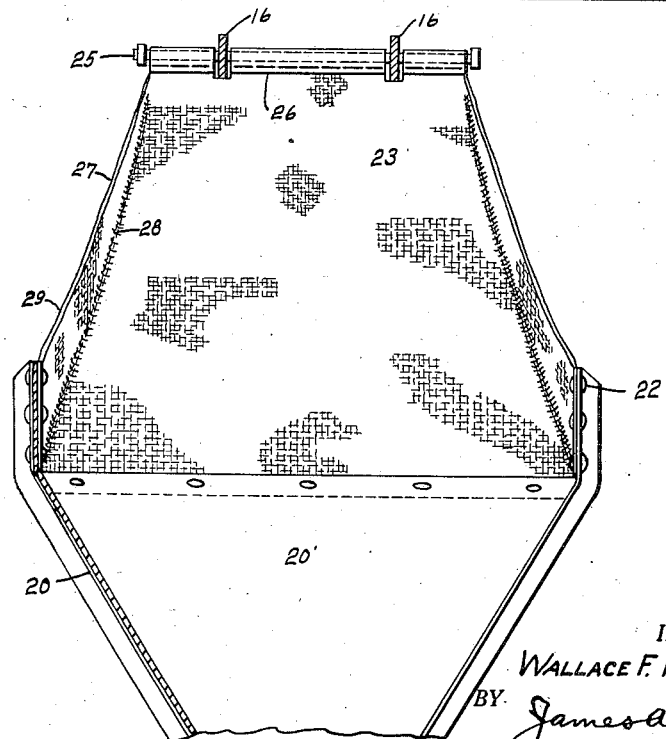

In the accompanying drawing, forming part hereof, Figure 1 is a side elevation of a baling press of well known manufacture embodying my improvement; and Fig. 2 is an elevation of the baffle which I employ, as seen when looking in the direction of the arrow in Fig. 1.

In said drawing the numeral 5 indicates the baling press body mounted upon carrying wheels 6, and equipped with a block dropper 7 of well known construction and operation. Such a press, as is common, includes driving mechanism, as twin gears 10, pulley 11, fly-wheel 12, and other rotatably engageable elements for actuating the plunger 13 positioned in baling chamber 14 and connected to the pitman 15, as well as the lever 16, pivotally connected at 17 to the fulcrum post 18, and to the outer end of which lever a feeder-head 19 is pivotally connected to reciprocate through the hopper 20 leading to chamber 14, a pair of guide links 21 being pivotally connected to said post and feeder-head, but as said parts are or may be of common and well known construction and operation it is deemed unnecessary to further specifically describe the same.

To one of the inclined walls 20' of hopper 20, and preferably to supports 22, a baffle 23 is attached, comprising flexible material, such as canvas or the like, the opposite end of which baffle is secured to lever members 16, as by a rod 25 passing through the members of the lever, and about which rod the baffle may be stitched or riveted, at 26, and when lever 16 is in its lowermost position, as indicated in Fig. 1, said baffle will be in folded or collapsed condition, the lever and baffle being indicated by dotted lines. While the baffle is shown as attached to supports 22, and wall 20', it will be understood, of course, that it may be secured directly to the inclined wall of the hopper, and also that other means may be employed for attaching the upper end of the baffle to lever 16. In Fig. 2 it will be noted that the baffle 23 converges from its lower end to its connection with rod 25, and its side edges 27 are folded, at 28, to form walls 29, thus producing in effect a trough-like receptacle.

In operation, as is common, the feeder-head 19 is reciprocated in a rapid manner while loose material is being constantly conveyed into hopper 20, and as the feeder moves upwardly therethrough a considerable amount of material is carried upwardly and outwardly by the feeder-head, which is commonly of a toothed or roughened character, and scatters in the direction of the baffle, which, during the upward movement of the feeder-head, becomes gradually straightened and suddenly stretched its full length into substantially taut condition as the lever 16 moves to its uppermost position, which sudden stretching of the baffle imparts thereto a quick jerking action in the direction of the hopper and intercepts the material falling from the feeder-head so that it is impelled into the hopper to be baled, instead of falling beyond or hanging over the edge of the hopper or lodging between the actuating elements of the baler, which is a common objection in the use of such machines. It will thus be seen that the normally collapsed baffle follows the reciprocating action of lever 16 and is always in proper thwarting position as the lever is reaching the limit of its upward stroke, and, being provided with the side walls 29, it will be obvious that such trough-like baffle is of considerable capacity and that lateral escape of material will be prevented.

I claim as my invention:

1. In a baling press, a reciprocating feeder-head, mechanism for actuating the feeder-head, and a flexible and collapsible baffle positioned exteriorly of the press between the feeder-head and actuating mechanism for preventing material entering the latter.

2. In a baling press, a reciprocating feeder-head, mechanism for actuating the feeder-head, and a trough-like flexible and collapsible baffle positioned exteriorly of the press between the feeder-head and actuating mechanism for preventing material entering the latter.

3. In a baling press, a feeder-head, a lever secured to the feeder-head, means for actuating the lever to reciprocate the feeder-head, and a flexible collapsible baffle secured to the lever to follow the movements of the latter for preventing material entering the actuating means and returning such material into the press.

4. In a baling press, a feeder-head, a lever secured to the feeder-head, means for actuating the lever to reciprocate the feeder-head, and a flexible collapsible baffle including side retaining walls secured to the lever to follow the movements of the latter for preventing material entering the actuating means and returning such material into the press.

5. In a baling press having a feeding chamber, a hopper communicating with the chamber, a feeder-head adapted to reciprocate through the hopper, a lever secured to the feeder-head, means for actuating the lever to reciprocate the feeder-head, and a flexible baffle secured to the lever and to the hopper adapted to fold as the lever is actuated downwardly and to unfold as the lever is actuated upwardly.

6. In a baling press including a feeding chamber, a feeder-head adapted to reciprocate therein, a lever secured to the feeder-head, means for actuating the lever to reciprocate the feeder-head, and a baffle secured at one end to the press and its opposite end attached to the lever and adapted to follow the reciprocating movements of the lever to intercept material withdrawn from the chamber by the feeder-head and to return such material to the chamber to be baled.

7. In a baling press including means for introducing material into its baling chamber, a reciprocating feeder-head associated with the press, and a flexible baffle associated with the material introducing means and the feeder-head, said baffle being substantially taut when the feeder-head is moved upwardly for preventing escape of material and at the same time adapted to impart thwarting action to the material for returning it to the introducing means.

8. In a baling press including means for introducing material thereinto, a reciprocating feeder-head associated with the press, a flexible baffle connecting the introducing means and the feeder-head in such relation that the baffle will be taut when the head is moved away from the introducing means and in collapsed condition when said feeder-head is in the introducing means.

9. In a baling press including a hopper, means for feeding material into the hopper, and flexible foldable means positioned exteriorly of and connected to said hopper and to the feeding means for intercepting material escaping from and returning such material into the hopper.

WALLACE F. MacGREGOR.